Patented Feb. 7, 1933

1,896,520

UNITED STATES PATENT OFFICE

ERNST KOMM, OF DRESDEN-WEISSER HIRSCH, GERMANY

PROCESS FOR THE MANUFACTURE OF A DISEMBITTERED PRODUCT OF WHEAT-GERM

No Drawing.      Application filed May 24, 1928. Serial No. 280,379.

The present invention has for its object a process for the manufacture of a disembittered product of wheat-germ of agreeable taste and a high proportion of nutrients, especially of a high proportion of vitamine and vitasterine. For this purpose the wheat-germs are mashed in their non-ground or ground state with water of about 55 to 65 degrees centigrade and kept, while agitated, on said temperature for about six hours. By this means an opening up of the cells of the wheat-germs is obtained and the bitter principles (alkaloids and volatile fatty acids) are removed from the cells and dissolved or suspended within the surrounding liquid. By a subsequent and rapid distillation of the water, the bitter principles mentioned are carried away together with the water-vapors and thereby removed from the product of wheat-germ. The procedure is similar to "a distillation by steam" according to chemical-technical ideas.

*Example for performing the process*

Wheat-germs are thoroughly mixed in their ground or non-ground state with the double or triple quantity of ordinary water of a temperature of approximately 55 to 65 degrees centigrade. The mixture is kept on this temperature during approximately six hours while permanently agitating it, whereby the soluble constituents are dissolved from the germ-cells. Hereafter the mixture obtained by reaction is brought into an apparatus, preferably into a drying apparatus arranged with a drum, which allows a most rapid possible evaporation of the water from the solution mixture. Said drying-apparatus or drier arranged with a drum can be heated from its interior and in a known manner by steam, water or the like and the reaction-mixture is supplied from outward onto the heated drum-surface. The volatile bitter-principles of the wheat-germs are contained within the evaporating medium. The remaining dry-product is freed from the greatest part of the bitter-principles and has an agreeable malt-like taste for the reason that by the mash-procedure simultaneously a part of the high molecular nutrients of the wheat-germ, and especially a part of the amylum is transformed into lower molecular products of nutrients, said products being easier digestible and of a more agreeable taste. The dried disembittered wheat-germ meal is finely or roughly ground to various degrees for the different purposes.

The entire disembittering-procedure is performed in such a manner that a destruction of the activity of the vitamines or vitasterines contained within the wheat-germ does not take place. The noxious or less important ferments of the peroxydases are, however destroyed or their efficiency reduced to zero by the procedure described above.

The process can be performed without the least possible presence of atmospheric air, said absence of air being obtained by the mashing-operation taking place in closed vessels, in which the upper gas-space or room is filled with steam. Said upper gas-space of the mash-vessels can also be filled with carbonic dioxide, said gas not being noxious to the activity of the vitamines and vitasterines. The carbonic dioxide will, by its higher specific gravity, attempt to sink and, in consequence, will directly remain near the limiting layer situated between the mash-liquid and the gas-space and close said liquid against the oxygen of the atmosphere. In the procedure of distillation by steam, for instance in a drying-plant utilizing drums filled with steam, the product is fully enveloped by steam or water-vapors, so that a sufficient exclusion of the atmosphere is obtained. Said steam or vapors have no effect to the activity of the vitamines and vitasterines.

What I claim is:

1. A process for the manufacture of a disembittered product of wheat-germ of an agreeable taste and a high proportion of vitamine and vitasterine, which consists in that, for the purpose of removing the bitter-principles from the wheat-germs the latter are mashed in the presence of an atmosphere of carbonic dioxide and the mixture obtained by reaction is, for the removal of the bitter-principles, subjected to a distillation by steam.

2. A process for the manufacture from wheat germs of a disembittered product having an agreeable taste, and a high proportion of vitamines, vitasterines, and other nutrients, comprising mashing the wheat germs with water to remove therefrom the bitter principles by solution in the water, and subjecting the mixture obtained by the mashing-reaction to steam-distillation to remove the bitter principles from the mash.

3. A process for the manufacture from wheat germs of a disembittered product having an agreeable taste, and a high proportion of vitamines, vitasterines, and other nutrients, comprising mashing the wheat germs with water while excluding the atmospheric air, and subjecting the mixture obtained from the mashing-reaction to steam-distillation to remove the bitter principles.

In testimony that I claim the foregoing as my invention, I have signed my name this 21st day of April, 1928.

ERNST KOMM.